United States Patent
Lin et al.

(10) Patent No.: US 10,539,855 B2
(45) Date of Patent: Jan. 21, 2020

(54) NARROW FRAME DISPLAY PANEL AND DISPLAY DEVICE

(71) Applicants: BOE Technology Group Co., Ltd., Beijing (CN); Hefei Xinsheng Optoelectronics Technology Co., Ltd, Anhui (CN)

(72) Inventors: Lin Lin, Beijing (CN); Hui Wang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 112 days.

(21) Appl. No.: 15/088,781

(22) Filed: Apr. 1, 2016

(65) Prior Publication Data
US 2017/0053607 A1    Feb. 23, 2017

(30) Foreign Application Priority Data
Aug. 17, 2015    (CN) .......................... 2015 1 0505387

(51) Int. Cl.
*G02F 1/167*    (2019.01)
*G09G 3/34*    (2006.01)
(Continued)

(52) U.S. Cl.
CPC ............. *G02F 1/167* (2013.01); *G09G 3/344* (2013.01); *G02F 2001/133388* (2013.01);
(Continued)

(58) Field of Classification Search
None
See application file for complete search history.

(56) References Cited

U.S. PATENT DOCUMENTS 6,654,084 B1 *   11/2003   Marukawa ........ G02F 1/133512
                                                    349/106
2006/0164587 A1 *  7/2006   Oh ...................... G02F 1/13452
                                                    349/152
(Continued)

FOREIGN PATENT DOCUMENTS

CN      102667583 A      9/2012
CN      103268032 A      8/2013
(Continued)

OTHER PUBLICATIONS

Sep. 4, 2017—(CN) First Office Action Appn. 201510505387.0 with English Tran.

*Primary Examiner* — Kent W Chang
*Assistant Examiner* — Benjamin Morales
(74) *Attorney, Agent, or Firm* — Banner & Witcoff, Ltd.

(57) ABSTRACT

A display panel and a display device are disclosed; and the display panel includes a first substrate and a second substrate which are disposed opposite to each other, and a light shielding pattern located between the two substrates; a side of the first substrate away from the second substrate is a light emitting side of the display panel; a plurality of first pixel units are additionally disposed in a peripheral region of the display panel and a side of the light shielding pattern away from the second substrate, and a driving circuit electrically connected with the first pixel units and a printed circuit board of the display panel.

15 Claims, 3 Drawing Sheets

(51) Int. Cl.
  *G09G 3/3208* (2016.01)
  *G09G 3/36* (2006.01)
  *G02F 1/1333* (2006.01)

(52) U.S. Cl.
  CPC ....... *G02F 2201/44* (2013.01); *G09G 3/3208* (2013.01); *G09G 3/3611* (2013.01); *G09G 2300/023* (2013.01); *G09G 2310/0232* (2013.01)

(56) References Cited

U.S. PATENT DOCUMENTS

| | | | |
|---|---|---|---|
| 2007/0242014 A1* | 10/2007 | Lee | G02F 1/133514 345/88 |
| 2008/0170016 A1 | 7/2008 | Wada et al. | |
| 2008/0204399 A1* | 8/2008 | Choi | G09G 3/344 345/107 |
| 2008/0224990 A1* | 9/2008 | Shimodaira | G02F 1/136227 345/107 |
| 2009/0113291 A1* | 4/2009 | Barclay | G06F 3/03547 715/243 |
| 2009/0135364 A1* | 5/2009 | Lee | G02F 1/13452 349/149 |
| 2009/0147186 A1* | 6/2009 | Nakai | G02F 1/13471 349/74 |
| 2011/0080723 A1 | 4/2011 | Kaluzhny | |
| 2012/0200554 A1* | 8/2012 | Kim | G09G 3/344 345/211 |
| 2014/0092466 A1* | 4/2014 | Wang | G02F 1/167 359/296 |
| 2014/0184472 A1* | 7/2014 | Xia | G06F 3/1446 345/1.3 |
| 2015/0022424 A1* | 1/2015 | Jepsen | G06F 3/1446 345/1.3 |
| 2016/0267860 A1* | 9/2016 | Liu | G09G 3/20 |
| 2016/0341870 A1* | 11/2016 | Xie | G02B 6/0016 |
| 2016/0351648 A1* | 12/2016 | Ek | H01L 27/3267 |

FOREIGN PATENT DOCUMENTS

| | | |
|---|---|---|
| CN | 104701352 A | 6/2015 |
| JP | 2004133438 A | 4/2004 |
| JP | 2011180360 A | 9/2011 |

* cited by examiner

NARROW FRAME DISPLAY PANEL AND DISPLAY DEVICE

This application claims priority to and the benefit of Chinese Patent Application No. 201510505387.0 filed on Aug. 17, 2015, which application is incorporated herein in its entirety.

TECHNICAL FIELD

Embodiments of the present disclosure relate to a display panel and a display device.

BACKGROUND

With the continuous development of display technologies, flat plate displays such as light emitting diode (LED) displays, organic light emitting diode (OLED) displays, plasma display panels (PDP), and liquid crystal displays (LCD) are developing rapidly.

SUMMARY

An embodiment of the present disclosure provide a display panel, comprising: a first substrate and a second substrate which are disposed opposite to each other, a light shielding pattern sandwiched between the first substrate and the second substrate; a side of the first substrate away from the second substrate is a light emitting side of the display panel; a plurality of first pixel units are located in a peripheral region of the display panel and at a side of the light shielding pattern away from the second substrate; and a driving circuit electrically connected with all of the first pixel units and a printed circuit board of the display panel.

An embodiment of the present disclosure further provides a display device, comprising the abovementioned display panel provided by the embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 2a is a sectional view along the direction AA in FIG. 1a; and

DRAWING REFERENCE NUMBERS

1—first substrate; 2—second substrate; 3—light shielding pattern; 4—first pixel unit; 40—first sub-pixel unit; 41—first transparent electrode; 42—second transparent electrode; 43—electrophoresis unit; 431—black charged particle; 432—charged particle with a same color as the first sub-pixel unit to which the electrophoresis unit belongs (for example, red charged particle, green charged particle or blue charged particle); 433—white charged particle; 5—driving circuit; 6—second pixel unit; 60—second sub-pixel unit.

DETAILED DESCRIPTION

At present, narrow frame design and even frame-free design are developing trends of the display field. For example, an LCD generally comprises a display region and a peripheral region surrounding the display region; the display region is provided with a plurality of pixel units configured for displaying images, and the peripheral region is provided with peripheral lead wires, connecting terminals and driving circuits, etc. A width of the peripheral region may be regarded as the frame width of the LCD. In order to realize a narrow frame design for LCD, the technique of integrating gate driving circuits on an array substrate of an LCD (Gate-on-array, GOA) is generally adopted, i.e., forming gate driving circuits in the peripheral region of the array substrate. However, the gate driving circuit integrated on the array substrate of the LCD still occupies a certain width, which suppresses the realization of an ultra narrow frame design and even frame-free design for LCD.

Hereinafter, the display panels and display devices provided in the embodiments of the disclosure will be described in detail with reference to the accompanying drawings.

The shape and thickness of respective components in the figures do not reflect the true scales, the purpose of which is merely to schematically illustrate the embodiments of present disclosure.

Embodiments of the present invention provide a display panel and a display device, which are allowed to realize an ultra narrow frame design and even a frame-free design.

Figure 1A:
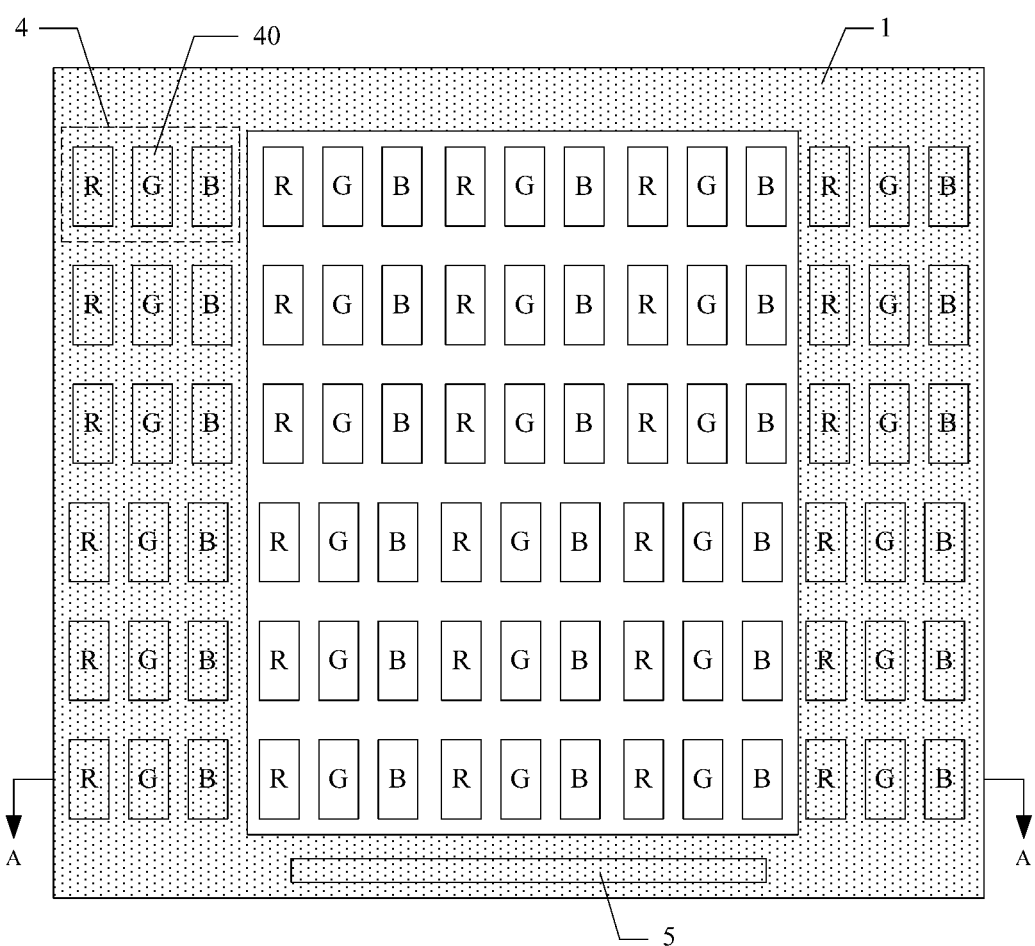
FIG. 1a and FIG. 1b respectively are structural schematic diagrams of display panels provided by the embodiments of the present disclosure.
Figure 1B:
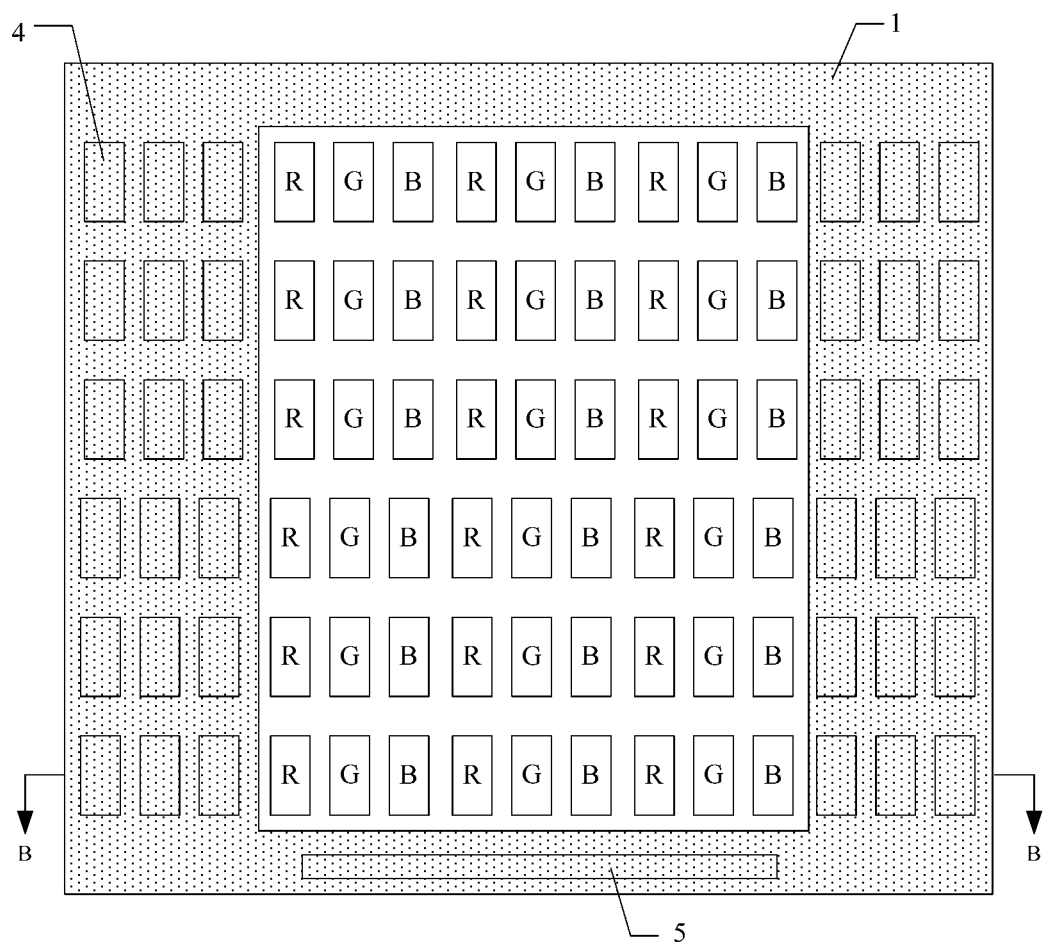
Figure 2A:
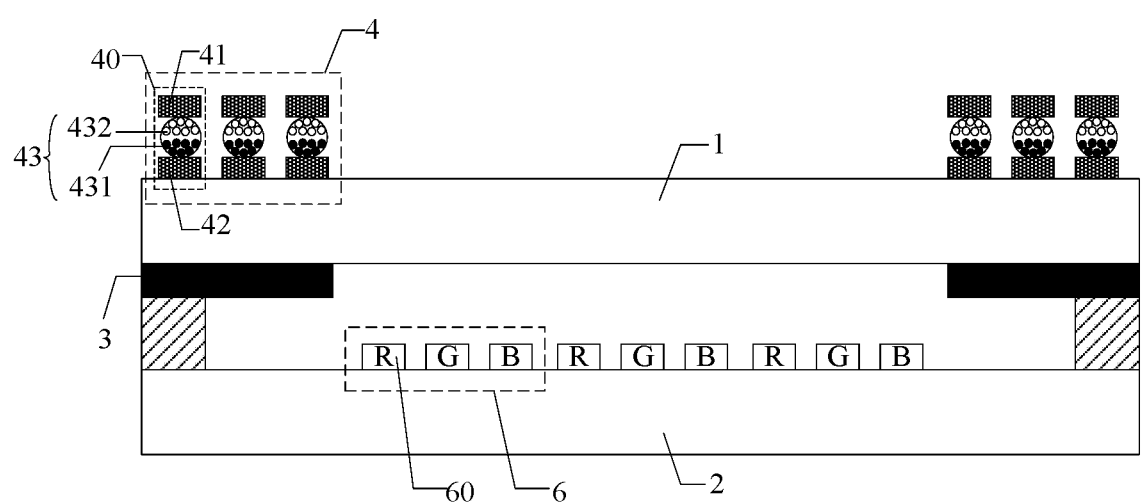
Figure 2B:
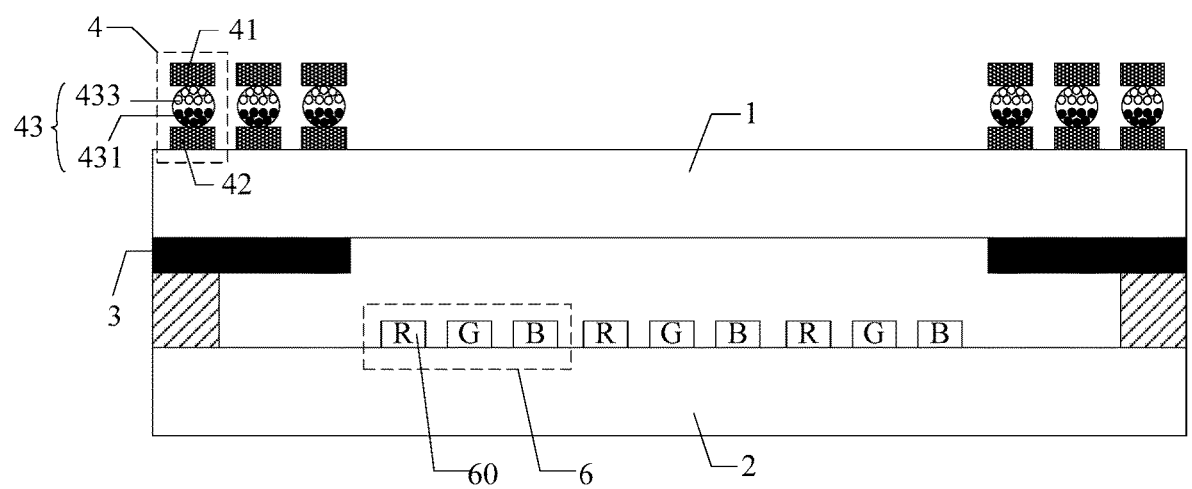
FIG. 2b is a sectional view along a direction BB in FIG. 1b.

Embodiments of the present disclosure provide a display panel, as illustrated by FIG. 1a, FIG. 1b, FIG. 2a and FIG. 2b (FIG. 2a is a sectional view along a direction AA in FIG. 1a, FIG. 2b is a sectional view along a direction BB in FIG. 1b), and the display panel comprises: a first substrate 1 and a second substrate 2 which are disposed opposite to each other, and a light shielding pattern 3 located between the first substrate 1 and the second substrate 2; the side of the first substrate 1 away from the second substrate 2 is a light emitting side of the display panel. The display panel further comprises a plurality of first pixel units 4 and a driving circuit 5, and the first pixel units 4 are located in a peripheral region (as illustrated by a shadow region in FIG. 1a and FIG. 1b) of the display panel and at a side of the light shielding pattern 3 away from the second substrate 2, and the driving circuit 5 electrically connected with all of the first pixel units 4 and a printed circuit board of the display panel.

In the abovementioned display panels provided by the embodiment of the present disclosure, because a plurality of first pixel units are additionally disposed in the peripheral region of the display panel and at a side of the light shielding pattern away from the second substrate, and a driving circuit is electrically connected with all of first pixel units and with a printed circuit board of the display panel, the driving circuit can drive the first pixel units to display images, so as to enable the peripheral region of the display panel to display an image, so as to further enable the display panel to realize an ultra narrow frame design and even a frame-free design.

It should be noted that the peripheral regions of the abovementioned display panel provided by the embodiment of the present disclosure may be similar to the peripheral regions of a conventional display panels and may also be provided with a peripheral wiring, a connecting terminal, a driving circuit, etc.

Optionally, the display panels provided by the embodiments of the present disclosure may be applied to liquid crystal display panels (LCDs); or the display panels provided by the embodiments of the present disclosure may also be applied to organic light emitting display (OLED) panels and the like; and the present disclosure is not limited in this aspect.

In the case where a display panel provided by an embodiment of the present disclosure is applied to an LCD, in the LCD, because a side of the opposed substrate away from an array substrate is a light emitting side of the LCD, the first substrate is the opposed substrate, and the second substrate is the array substrate; the light shielding pattern in the LCD generally is implemented as a black matrix of the LCD; as illustrated by FIG. 2a and FIG. 2b, the light shielding patterns 3 may be located at a side of the first substrate 1 facing the second substrate 2, or the light shielding patterns may be located at a side of the second substrate facing the first substrate, as long as the light shielding patterns can realize the corresponding light shielding effect, which is not limitative here.

In the case where a display panel provided by the embodiment of the present disclosure is applied to an OLED, the light shielding pattern in the OLED generally is implemented as a pixel defining layer. Generally, OLEDs may be divided into top emitting type OLEDs (i.e., a side of a packaging cover plate away from an array substrate is a light emitting side of an OLED) and bottom emitting type OLEDs (i.e., a side of an array substrate away from a packaging cover plate is a light emitting side of an OLED). If a display panel provided by an embodiment of the present disclosure is applied to a top emitting type OLED, because a side of a packaging cover plate away from an array substrate is a light emitting side of the OLED, the first substrate is the packaging cover plate, and the second substrate is the array substrate. If a display panel provided by an embodiment of the present disclosure is applied to a bottom emitting type OLED, because a side of an array substrate away from a packaging cover plate is a light emitting side of the OLED, the first substrate is the array substrate, and the second substrate is the packaging cover plate.

Optionally, in a display panel provided by an embodiment of the present disclosure, as illustrated by FIG. 1a and FIG. 1b, the first pixel units 4 are disposed in left and right areas of the peripheral region of the display panel, and the driving circuit 5 may be disposed in the upside area or the downside of the peripheral region of the display panel (FIG. 1a and FIG. 1b illustrates a case where the driving circuit 5 is located in a downside area of the peripheral region for example), so the left and right areas of the peripheral region of the display panel can be configured to display an image or part of an image, so as to allow the display panel to be implemented in an ultra narrow frame design or even a frame-free design on the right and left sides. Alternatively, the first pixel units may also be disposed in upside and downside areas of the peripheral region of the display panel, the driving circuit is disposed in left and right areas of the peripheral region of the display panel, so the upside and downside areas of the peripheral region of the display panel may be configured to display an image or part of an image, so as to allow the display panel to be implemented in an ultra narrow frame design or even a frame-free design on the upside and downside areas.

It should be noted that, in the abovementioned display panel provided by the embodiment of the present disclosure, the light shielding pattern is located between the first substrate and the second substrate, and the first pixel units are located at a side of the light shielding pattern away from the second substrate, thus, optionally, as illustrated by FIG. 2a and FIG. 2b, the first pixel units 4 may be located at a side of the first substrate 1 away from the second substrate 2, or, the first pixel units may be located between the light shielding pattern and the first substrate, which is not limitative here. Preferably, in the abovementioned display panel provided by the embodiment of the present invention, in order to facilitate disposing of the first pixel units, as illustrated by FIG. 2a and FIG. 2b, the first pixel units 4 are disposed at a side of the first substrate 1 away from the second substrate 2.

Furthermore, in the abovementioned display panel provided by the embodiment of the present disclosure, in order to facilitate realizing electrical connection of the first pixel units with the driving circuit, the first pixel units and the driving circuit may be disposed at the same side of the first substrate, as illustrated by FIG. 1a, FIG. 1b, FIG. 2a and FIG. 2b, the first pixel units 4 and the driving circuit 5 are located at a side of the first substrate 1 away from the second substrate 2, and thus it is favorable to dispose the first pixel units 4 and the driving circuit 5 and also realize the electrical connection between them.

Optionally, in the display panel provided by an embodiment of the present disclosure, the first pixel units additionally disposed in the peripheral region may be used to display a colorful image; or, the first pixel units additionally disposed in the peripheral region may also be used to display a black-white image, which is not limitative here.

Hereafter, the specific examples of the display panels provided by the embodiments of the prevent disclosure which are applied to the two kinds of display modes will be described in detail. The following two embodiments provided by the present disclosure both take the configuration in which all of first pixel units and the driving circuit are located at a side of the first substrate away from the second substrate for example.

First Embodiment

First pixel units additionally disposed in the peripheral region of the abovementioned display panel provided by an embodiment of the present disclosure are configured to display a colorful image.

In the abovementioned display panel provided by an embodiment of the present disclosure, as illustrated by FIG. 1a, each of first pixel units 4 may comprises a plurality of first sub-pixel units 40 with different colors; for example, as illustrated by FIG. 1a, each of the first pixel units 4 may comprise red (R), green (G) and blue (B) first sub-pixel units 40, or, each of the first pixel units may also comprise red (R), green (G), blue (B) and yellow (Y) first sub-pixel units, which is not limitative here. As illustrated by FIG. 2a, each first sub-pixel unit 40 may comprise a first transparent electrode 41 and a second transparent electrode 42 which are disposed opposite to each other (FIG. 2a takes a case where a first transparent electrode 41 is closer to a light emitting side of a display panel than a second transparent electrode 42 for example), and at least one electrophoresis unit 43 located between the first transparent electrode 41 and the second transparent electrode 42 and arranged side by side along a surface of the first transparent electrode 41 or a surface of the second transparent electrode 42; the first transparent electrode 41 and the second transparent electrode 42 of each first sub-pixel unit 40 are electrically connected with a driving circuit 5, respectively; each electrophoresis unit 43 comprises black charged particles 431 and charged particles 432 with a same color as the first sub-pixel unit to which the electrophoresis unit belongs; for example, each electrophoresis unit of red (R) first sub-pixel unit comprises black charged particles and red charged particles, each electrophoresis unit of green (G) first sub-pixel unit comprises black charged particles and green charged particles, and each electrophoresis unit of blue (B) first sub-pixel unit comprises black charged particles and blue charged particles.

It should be noted that, in the abovementioned display panel provided by an embodiment of the present disclosure, the charges carried by two kinds of charged particles of each electrophoresis unit have opposite polarities, the black charged particles may be positively charged, and the charged particles with a same color the first sub-pixel unit to which the electrophoresis unit belongs may be negatively charged; or, the black charged particles may be negatively charged, and the charged particles with a same color as the first sub-pixel unit to which the electrophoresis unit belongs may be positively charged, which is not limitative here.

Hereafter, the working principle of the red first sub-pixel unit for displaying red or black in the display panel illustrated by FIG. 2a will be described in detail by taking a case where the black charged particles are positively charged, and the red charged particles are negatively charged for example. Upon the driving circuit 5 applying voltages to the first transparent electrode 41 and the second transparent electrode 42 in the red (R) first sub-pixel unit 40, the first transparent electrode 41 and the second transparent electrode 42 generate an electric field therebetween, the black charged particles 431 and the red charged particles 432 move under the action of the electric field. If the voltage applied to the first transparent electrode 41 by the driving circuit 5 is larger than that of the second transparent 42, the positively charged black charged particles 431 move towards the second transparent electrode 42, and the negatively charged red charged particles 432 move towards the first transparent electrode 41; because the first transparent electrode 41 is closer to the light emitting side of the display panel than the second transparent electrode 42, red charged particles 432 are closer to the light emitting side of the display panel than the black charged particles 431; external natural light is incident on the red charged particles 432 and is scattered, so that the red (R) first sub-pixel unit 40 is allowed to display red. If the voltage applied to the first transparent electrode 41 by the driving circuit 5 is smaller than that of the second transparent 42, the positively charged black charged particles 431 move towards the first transparent electrode 41, and the negatively charged red charged particles 432 move towards the second transparent electrode 42; because the first transparent electrode 41 is closer to the light emitting side of the display panel than the second transparent electrode 42, the black charged particles 431 are closer to the light emitting side of the display panel than the red charged particles 432; external natural light is incident on the black charged particles 431 and scattered, so that the red (R) first sub-pixel unit 40 is allowed to display black.

It should be noted that, the working principle of the green first sub-pixel unit for displaying green or black and the working principle of the blue first sub-pixel unit for displaying blue or black in the display panel provided by an embodiment of the present disclosure are similar to the abovementioned working principle of the red first sub-pixel unit for displaying red or black, which is not repeated here. The embodiments of the present disclosure are not limited to these specific examples.

Optionally, the display panel provided by an embodiment of the present invention, as illustrated by FIG. 1a and FIG. 2a, may further comprise a plurality of second pixel units 6 located between the first substrate 1 and the second substrate 2 and in a region surrounded by the peripheral region of the display panel; each second pixel unit 6 may comprise a plurality of second sub-pixel units 60 with color filters of different colors, for example, as illustrated by FIG. 1a and FIG. 2a, each of the second pixel units 6 may comprise red (R), green (G) and blue (B) second sub-pixel units 60, or each of the second pixel units 6 may comprise red (R), green (G), blue (B) and yellow (Y) second sub-pixel units, which is not limitative here; preferably, the area of an orthographic projection of each of the first sub-pixel units 40 on the first substrate 1 is equal to that of each of the second sub-pixel units 60 on the first substrate 1, which can ensure that the display resolution of the image displayed in the peripheral region of the display panel is in accordance with that in the region surrounded by the peripheral region, so as to ensure the display quality of the display panel.

Certainly, in the display panel provided by an embodiment of the present disclosure, the area of the orthographic projection of any one of the first sub-pixel units 40 on the first substrate 1 may be unequal to that of any one of the second sub-pixel units 60 on the first substrate 1, which is not limitative here.

Second Embodiment

First pixel units additionally disposed in the peripheral region of the abovementioned display panel provided by an embodiment of the present disclosure are configured to display a black-white image.

In the display panel provided by an embodiment of the present disclosure, as illustrated by FIG. 2b, each of first pixel unit 4 may comprise a first transparent electrode 41 and a second transparent electrode 42 which are disposed opposite to each other (FIG. 2b takes a case where a first transparent electrode 41 is closer to a light emitting side of a display panel than a second transparent electrode 42 for example), and at least one electrophoresis unit 43 located between the first transparent electrode 41 and the second transparent electrode 42 and arranged side by side along a surface of the first transparent electrode 41 or a surface of the second transparent electrode 42; the first transparent electrode 41 and the second transparent electrode 42 of each of the first pixel units 4 are electrically connected with a driving circuit 5, respectively; and each electrophoresis unit 43 comprises black charged particles 431 and white charged particles 433.

It should be noted that, in the display panel provided by an embodiment of the present disclosure, the charges carried by two kinds of charged particles of each electrophoresis unit have opposite polarities, the black charged particles may be positively charged, and the white charged particles may be negatively charged; or, the black charged particles may be negatively charged, and the white charged particles may be positively charged, which is not limitative here.

Hereafter, the working principle of the first pixel unit for displaying white or black in the display panel illustrated by FIG. 2b will be described in detail by taking a case where the black charged particles are positively charged, and the white charged particles are negatively charged for example. Upon the driving circuit 5 applying voltages to the first transparent electrode 41 and the second transparent electrode 42 in the first pixel unit 4, the first transparent electrode 41 and the second transparent electrode 42 generate an electric field therebetween, the black charged particles 431 and the white charged particles 433 move under the action of the electric field. If the voltage applied to the first transparent electrode 41 by the driving circuit 5 is larger than that of the second transparent 42, the positively charged black charged particles 431 move towards the second transparent electrode 42, and the negatively charged white charged particles 432 move towards the first transparent electrode 41; because the first transparent electrode 41 is closer to the light emitting side of the display panel than the second transparent electrode 42, white charged particles 433 are closer to the light emitting side of the display panel than the black charged particles 431; external natural light is incident on the white charged particles 433 and scattered, so that the white first pixel unit 4 is allowed to display white. If the voltage applied to the first transparent electrode 41 by the driving circuit 5 is smaller than that of the second transparent 42, the positively charged black charged particles 431 move towards the first transparent electrode 41, and the negatively charged white charged particles 433 move towards the second transparent electrode 42; because the first transparent electrode 41 is closer to the light emitting side of the display panel than the second transparent electrode 42, black charged particles 431 are closer to the light emitting side of the display panel than the white charged particles 433; external natural light is incident on the black charged particles 431 and scattered, so that the first pixel unit 4 is allowed to display black.

Optionally, the display panel provided by an embodiment of the present invention, as illustrated by FIG. 1b and FIG. 2b, may further comprise a plurality of second pixel units 6 located between the first substrate 1 and the second substrate 2 and in a region surrounded by the peripheral region of the display panel; each of the second pixel units 6 may comprise a plurality of second sub-pixel units 60 with color filters of different colors, for example, as illustrated by FIG. 1a and FIG. 2a, each of the second pixel units 6 may comprise red (R), green (G) and blue (B) second sub-pixel units 60, or each of the second pixel units may comprise red (R), green (G), blue (B) and yellow (Y) second sub-pixel units, which is not limitative here; preferably, the area of an orthographic projection of each of the first sub-pixel units 40 on the first substrate 1 is equal to that of each of the second sub-pixel units 60 on the first substrate 1, which can ensure that the display resolution of the image displayed in the peripheral region of the display panel is in accordance with that in the region surrounded by the peripheral region, so as to ensure the display quality of the display panel.

In the embodiments of the present disclosure, the charged particles may be implemented with organic or inorganic particles; for example, titanium dioxide particles are used for displaying white, carbon particles are used for displaying black, phthalocyanine copper pigment particles are used for displaying blue, toluidine red particles are used for displaying red, and chrome oxide green particles are used for displaying green, and so on.

Certainly, in the display panel provided by an embodiment of the present disclosure, the area of the orthographic projection of each of the first sub-pixel units 40 on the first substrate 1 may be unequal to that of each of the second sub-pixel units 60 on the first substrate 1, which is not limitative here.

Based on the same disclosure concept, the embodiments of the present disclosure further provide a display device, which comprises the display panel according to any one of the embodiments of the present disclosure. The display device may be a cell phone, a tablet computer, a television, a display device, a notebook computer, a digital picture frame, a navigator and any product or component which can realize a display function. The implementations of the display devices may refer to any embodiment of the above mentioned display panel, which is not repeated here.

In a display panel and a display device provided by the embodiments of the present disclosure, the display panel comprises a first substrate and a second substrate which are disposed opposite to each other, and a light shielding pattern located between the two substrates; a side of the first substrate away from the second substrate is a light emitting side of the display panel; because a plurality of first pixel units are additionally disposed in a peripheral region of the display panel and a side of the light shielding pattern away from the second substrate, and a driving circuit is electrically connected with the first pixel units and a printed circuit board of the display panel, the driving circuit may drive the first pixel units to display an image, so as to enable the peripheral region of the display panel to display an image, which is allowed to further make the display panel realize in an ultra narrow frame design or even a frame-free design.

Apparently, it should be noted that various modifications and alternations may be made by those of ordinary skill in the art without departing from the spirit and scope of the present disclosure. If these modifications and alternations of the present disclosure are within the scope of claims of the present disclosure and their equivalent technologies, these modifications and alternations should also be viewed as falling within the protection scope of the present disclosure.

The present application claims the benefits of Chinese patent application No. 201510505387.0, which was filed with the SIPO on Aug. 17, 2015 and is fully incorporated herein by reference as part of this application.

What is claimed is:

1. A display panel, comprising:
a first substrate and a second substrate, which are disposed opposite to each other, and a light shielding pattern located between the first substrate and the second substrate, wherein a side of the first substrate away from the second substrate is a light emitting side of the display panel;
a plurality of first pixel units located in a peripheral region of the display panel and at a side of the light shielding pattern away from the second substrate; and
a driving circuit electrically connected with all of the first pixel units and connected with a printed circuit board of the display panel,
wherein the plurality of first pixel units are located directly on a surface of the first substrate away from the second substrate,
each of the first pixel units comprises a plurality of first sub-pixel units with different colors, each of the first sub-pixel units comprises: a first transparent electrode and a second transparent electrode, which are disposed opposite to each other, and at least one electrophoresis unit located between the first transparent electrode and the second transparent electrode and arranged side by side along a surface of the first transparent electrode or along a surface of the second transparent electrode,
the first transparent electrode and the second transparent electrode in each of the first sub-pixel units are electrically connected with the driving circuit, and
the at least one electrophoresis unit comprises black charged particles and charged particles having a same color as that of a first sub-pixel unit to which the at least one electrophoresis unit belongs.

2. The display panel according to claim 1, wherein the peripheral region comprises a left peripheral region, a right peripheral region, an upside peripheral region, and a downside peripheral region, and
wherein the first pixel units are located in the left peripheral region and the right peripheral region, and the driving circuit is located in at least one of the upside peripheral region and the downside peripheral region;

or, the first pixel units are located in the upside peripheral region and the downside peripheral region, and the driving circuit is located in at least one of the left peripheral region and the right peripheral region.

3. The display panel according to claim 1, further comprising a plurality of second pixel units located between the first substrate and the second substrate and in a region surrounded by the peripheral region, wherein each of the second pixel units comprises a plurality of second sub-pixel units with color filters of different colors.

4. The display panel according to claim 3, wherein an area of an orthographic projection of each of the first sub-pixel units onto the first substrate is equal to an area of an orthographic projection of each of the second sub-pixel units onto the first substrate.

5. The display panel according to claim 1, wherein the first substrate is an opposed substrate, the second substrate is an array substrate, and the light shielding pattern is a black matrix.

6. The display panel according to claim 1, wherein the first substrate is a packaging cover plate and the second substrate is an array substrate, or the first substrate is an array substrate and the second substrate is a packaging substrate; and
the light shielding pattern is a pixel defining layer.

7. The display panel according to claim 2, wherein the first substrate is an opposed substrate, the second substrate is an array substrate, and the light shielding pattern is a black matrix.

8. The display panel according to claim 2, wherein the first substrate is a packaging cover plate and the second substrate is an array substrate, or the first substrate is an array substrate and the second substrate is a packaging substrate; and
the light shielding pattern is a pixel defining layer.

9. A display device, comprising the display panel according to claim 1.

10. A display panel, comprising:
a first substrate and a second substrate, which are disposed opposite to each other, and a light shielding pattern located between the first substrate and the second substrate, wherein a side of the first substrate away from the second substrate is a light emitting side of the display panel;
a plurality of first pixel units located in a peripheral region of the display panel and at a side of the light shielding pattern away from the second substrate; and a driving circuit electrically connected with all of the first pixel units and connected with a printed circuit board of the display panel,
wherein the plurality of first pixel units are located directly on a surface of the first substrate away from the second substrate,
each of the first pixel units comprises: a first transparent electrode and a second transparent electrode which are disposed opposite to each other, and at least one electrophoresis unit located between the first transparent electrode and the second transparent electrode and arranged side by side on a surface of the first transparent electrode or on a surface of the second transparent electrode,
the first transparent electrode and the second transparent electrode in each of the first pixel units are electrically connected with the driving circuit, and
the at least one electrophoresis unit comprises black charged particles and white charged particles.

11. The display panel according to claim 10, further comprising a plurality of second pixel units located between the first substrate and the second substrate and in a region surrounded by the peripheral region, wherein each of the second pixel units comprises a plurality of second sub-pixel units with color filters of different colors.

12. The display panel according to claim 11, wherein each of the first pixel units comprises a plurality of first sub-pixel units, and wherein an area of an orthographic projection of each of the first sub-pixel units on the first substrate is equal to an area of an orthographic projection of each of the second sub-pixel units on the first substrate.

13. The display panel according to claim 10, wherein the first substrate is an opposed substrate, the second substrate is an array substrate, and the light shielding pattern is a black matrix.

14. The display panel according to claim 10, wherein the first substrate is a packaging cover plate and the second substrate is an array substrate, or the first substrate is an array substrate and the second substrate is a packaging substrate; and the light shielding pattern is a pixel defining layer.

15. A display device, comprising the display panel according to claim 10.

* * * * *